United States Patent
Baraff (10) Patent No.: US 7,852,338 B1
(45) Date of Patent: Dec. 14, 2010

(54) VELOCITY DRAG: SHAPE PRESERVATION OF SIMULATED OBJECTS IN COMPUTER ANIMATION

(75) Inventor: David Baraff, Oakland, CA (US)

(73) Assignee: Pixar, Emeryville, CA (US)

( * ) Notice: Subject to any disclaimer, the term of this patent is extended or adjusted under 35 U.S.C. 154(b) by 756 days.

(21) Appl. No.: 11/758,989

(22) Filed: Jun. 6, 2007

Related U.S. Application Data (60) Provisional application No. 60/812,313, filed on Jun. 8, 2006.

(51) Int. Cl.
*G06T 15/00* (2006.01)
(52) U.S. Cl. .................. 345/474; 345/473; 345/475
(58) Field of Classification Search .............. 345/473, 345/474, 475
See application file for complete search history.

(56) References Cited

U.S. PATENT DOCUMENTS

| | | | |
|---|---|---|---|
| 6,909,431 B1 | 6/2005 | Anderson et al. | |
| 7,206,729 B2 * | 4/2007 | Baraff et al. | 703/7 |
| 7,298,374 B2 * | 11/2007 | Styles | 345/473 |
| 7,385,601 B2 * | 6/2008 | Bingham et al. | 345/420 |
| 7,463,265 B2 * | 12/2008 | Styles | 345/473 |
| 7,652,670 B2 * | 1/2010 | Styles | 345/473 |

* cited by examiner

*Primary Examiner*—Phu Nguyen
(74) *Attorney, Agent, or Firm*—Townsend and Townsend and Crew LLP (57) ABSTRACT

A method for preserving the shape of simulated objects includes receiving the velocity of a location associated with a simulated object and a velocity associated with a reference object. While the difference between the velocity of the location associated with the simulated object and the velocity of the location associated with the reference object does not exceed a predetermined threshold, one or more forces are generated to act on the simulated object to minimize the difference between the velocity of the location associated with the simulated object and the velocity of the location associated with the reference object.

27 Claims, 6 Drawing Sheets

VELOCITY DRAG: SHAPE PRESERVATION OF SIMULATED OBJECTS IN COMPUTER ANIMATION

CROSS-REFERENCES TO RELATED APPLICATIONS

This application claims the benefit of and priority to U.S. Provisional Patent Application No. 60/812,313, filed Jun. 8, 2006 and entitled "Velocity Drag: Shape Preservation of Simulated Objects in Computer Animation," the entire disclosure of which is herein incorporated by referenced for all purposes.

This application is related to U.S. patent application Ser. No. 11/758,969, filed XX and entitled "Methods and Apparatus for Auto-scaling Simulated Objects," and U.S. patent application Ser. No. 11/758,984, filed XX and entitled "Shape Friction: Shape Preservation of Simulated Objects in Computer Animation," the entire disclosures of which are herein incorporated by referenced for all purposes.

BACKGROUND OF THE INVENTION

The present invention relates to computer animation. More specifically, the present invention relates to methods and apparatus for preserving the shape of simulated objects using techniques for velocity dragging.

In computer graphics imagery, motions and positions of secondary objects, such as hair, clothing, and plants are usually too complex for a human animator to directly control at every stage of a computer animation. Instead, the human animator specifies the physics and/or physical properties of the secondary or simulated objects. A computer program then employs physically-based numerical methods and techniques to simulate the motions and positions of the secondary objects over time based on the physics or physical properties of the individual secondary objects.

For simulated clothing objects, for example, the animator specifies the physical properties and construction of the cloth. For example, the animator specifies how the cloth bends due to forces or collisions with solid objects. The animator further specifies how the cloth deforms or collides with itself. Moreover, the animator specifies external forces that act on the cloth, such as gravity and wind.

In addition to modeling the physical properties of the simulated objects, the animator specifies motions and positions of kinematic or non-simulated objects (e.g., characters upon which the clothing objects rest). The animation of a non-simulated object generally is independent of and otherwise unaffected by motions and positions of simulated objects. However, the motions and positions of the non-simulated objects often are the principal influencer of motions and positions of simulated objects, as clothing and hair are likely to be associated with a kinematic character.

Consider a computer animation of a human character standing upright, wearing a jacket. The human character is a kinematic or non-simulated object that is directly animated by the skilled human animator. The animator specifies the physics (e.g., the physical properties) of the jacket which is a simulated object. In addition, the animator models how the jacket is associated with and worn by the human character. During simulation, the computer program simulates the motions and positions of the jacket using physically-based numerical techniques in response to external forces and the motions and positions of the human character.

If the physical properties and external forces acting on a simulated object are accurately modeled, the resulting motion of the simulated object will be plausible and seemingly realistic. In our jacket example, the cloth of the jacket should hang down and fold naturally. Furthermore, the cloth should react according to the motions and positions of the human character when the human character wears the jacket. However, modeling the simulated objects to be truly accurate is a delicate balance between the limitations and complexities of the animator's knowledge of physics and particle systems on the one hand and budgetary and time constraints on the other.

In addition, other problems exists with physically-based numerical methods and techniques used in computer animations. A particularly difficult problem in the simulation of secondary or simulated objects, such as cloth, is dealing with creeping or oozing behaviors. A creeping or oozing behavior occurs when motion of a simulated object associated with a non-simulated object continues in a visually unpleasing manner after a change in motion of the non-simulated object.

In the real world, most garments such as shirts, jackets, or pants undergo no significant movement or change in shape when their wearers cease moving. Internal forces in clothes, and friction between the clothes and their wearer, generally lock the clothes into a fixed position when the wearer's motion ceases. Typically, the clothes stops moving far less than a second after the wearer does. Although some garments, such as long dresses or ties, typically swing back and forth for some period of time, this desired and realistic motion is different from undesirable creeping or oozing behaviors that result during simulation using physically-based numerical methods and techniques.

Creating simulation programs for simulated objects, such as cloth, that can achieve the same effect after the wearer ceases moving has been difficult. One solution is to instruct the computer program during the simulation of our jacket example to freeze the cloth of the jacket in place whenever the human character ceases moving. The cloth then would be allowed to move again, when the human character begins to move. A problem with this solution is that our human character rarely remains exactly motionless. Typically, even when an animated character ceases movement, some small amount of "keep-alive" motion is applied. For example, the animator may rotate limbs of the character a few degrees or have the character sway back and forth just a little. It is during keep-alive motion, that the creeping or oozing of simulated objects is most apparent.

Accordingly, what is desired are improved methods and apparatus for solving the problems discussed above, while reducing the drawbacks discussed above.

BRIEF SUMMARY OF THE INVENTION

The present invention relates to computer animation. More specifically, the present invention relates to methods and apparatus for preserving the shape of simulated objects using techniques for velocity dragging.

In various embodiments, a method for preserving the shape of simulated objects includes receiving velocity of a location associated with a simulated object. Velocity is received of a location associated with a reference object. One or more forces are generated to act on the simulated object to minimize a difference between the velocity of the location associated with the simulated object and the velocity of the location associated with the reference object.

In some embodiments, the location associated with the simulated object may be a point substantially on a surface associated with the simulated object. The location associated with the reference object may be a surface region associated with the reference object. A mapping may be received between the location associated with the simulated object and the location associated with reference object.

In various embodiments, generating the one or more forces to act on the simulated object to minimize the difference between the velocity of the location associated with the simulated object and the velocity of the location associated with the reference object includes generating the one or more forces to act on the location associated with the simulated object to substantially align the velocity of the location associated with the simulated object with the velocity of the location associated with the reference object. The amount of the one or more forces may be reduced as the difference between the velocity of the location associated with the simulated object and the velocity of the location associated with the reference object approaches a predetermined threshold.

In one embodiment, motion of the simulated object may be determined in response to the reference object when the difference between the velocity of the location associated with the simulated object in the velocity of the location associated with the reference object exceeds the predetermined threshold. The reference object may include a non-simulated character object. The simulated object may include a cloth object.

In some embodiments, a computer program product is stored on a computer readable medium for preserving the shape of simulated objects. The computer program product includes code for receiving velocity of a location associated with a simulated object, code for receiving velocity of a location associated with a reference object, and code for generating one or more forces to act on the simulated object to minimize a difference between the velocity of the location associated with the simulated object and the velocity of the location associated with the reference object.

In one embodiment, a system for preserving the shape of simulated objects includes a processor and a memory. The memory is coupled to the processor and configured to store a set of instructions when executed by the processor configured the processor to receive velocity of a location associated with a simulated object, receive velocity of a location associated with a reference object, and generate one or more forces to act on the simulated object to minimize a difference between the velocity of the location associated with the simulated object and the velocity of the location associated with the reference object.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

The present invention relates to computer animation. More specifically, the present invention relates to methods and apparatus for preserving the shape of simulated objects using techniques for velocity dragging.

In various embodiments, simulated objects are elements of a computer animation display. The computer animation display may include simulated objects (e.g., secondary or dynamic object) such as cloth, garments and clothing, hair, and fur. The computer animation display may further include reference objects (e.g., kinematic, non-simulated objects, or other simulated objects), such as characters and/or collision objects.

Typically simulated objects are model, described, or represented as a collection of particles, connected to each other in some manner. In one example, a topological mesh is used in the case of clothing. In another example, a collection of strands or linear objects are used to describe hair or fur. Techniques of the present invention allow a simulation computer program to better display in visually desirable manners simulated objects that response to changes in motions and positions of reference or non-simulated objects.

Figure 1:
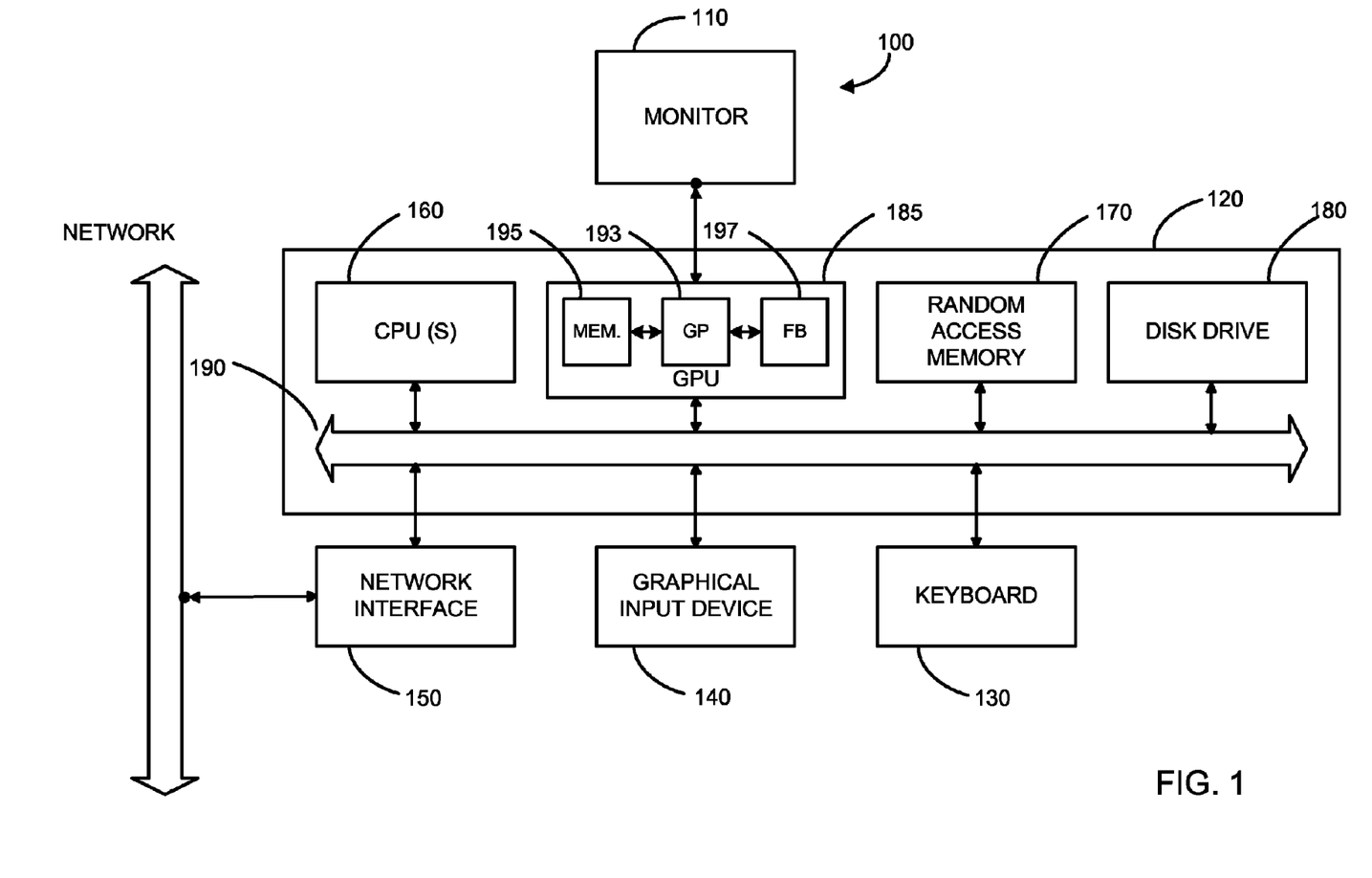
FIG. 1 is a block diagram of typical computer system according to an embodiment of the present invention.

FIG. 1 is a block diagram of typical computer system 100 according to an embodiment of the present invention.

In one embodiment, computer system 100 includes a monitor 110, computer 120, a keyboard 130, a user input device 140, computer interfaces 150, and the like.

In various embodiments, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, and may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In some embodiments, computer 120 includes one or more Xeon microprocessors from Intel. Further, in one embodiment, computer 120 includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In this example, GPU 185 includes a graphics processor 193, a number of memories and/or registers 195, and a number of frame buffers 197.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In various embodiments, computer system 100 allows an animator to preserve or maintain the shape of simulated objects, such as cloth and hair, to provide visually appealing animations.

Consider an example in which a jacket (i.e., a simulated object) is associated with an animated character (i.e., a non-simulated or kinematic object). In this example, the character has been walking, but has just stopped. The motions of the jacket may be simulated as influenced by the motions of the character using traditional physically-based numerical techniques. Accordingly, due to traditional physically-based numerical techniques, folds and wrinkles under the arms and down the torso of the character remain in motion until settling down after the character has remained motionless for a few seconds.

This undesired action of the jacket (e.g., the creeping or oozing of the cloth of the jacket) is visually displeasing during animation. In response to traditional physically-based numerical techniques, a slow creeping or oozing starts under the arms and down the torso of the character. The creeping or oozing occurs even though the overall difference between when the character stops moving and when the motion of the jacket settles is small.

According to various embodiments, shape preservation is provided using velocity dragging during simulation of objects in a computer animation display. In these embodiments, a simulated object may be associated with a non-simulated object. Motions and positions of the simulated object may be influenced by motions and positions of the non-simulated object. Additionally, the motions and positions of the simulated object may be simulated using physically-based numerical techniques.

In various embodiments, a mapping is received between a point associated with a simulated object and a point associated with a reference or non-simulated object. Velocity of a location associated with a simulated object is determined or received. Velocity of a location associated with a reference object is determined or received. One or more forces are generated (e.g., velocity dragging forces) to act on the simulated object to reduce or minimize the difference between the velocity of the location associated with the simulated object and the velocity of the location associated with reference object.

Accordingly, based on differences in velocities, or other derivatives of motion and position between the simulated object and the reference or non-simulated object, one or more forces are applied to the simulated object (e.g., at the location associated with the simulated object) to substantially align or match the velocities of the location of simulated object to the location of the reference object to maintain the shape of the simulated object and provide a more visually pleasant simulation of the simulated object. In some embodiments, once motions of a non-simulated object exceed a predetermined threshold, the forces preserving the shape are overcome, and the simulated object is free to fully move in response to the non-simulated object.

Figure 2A:
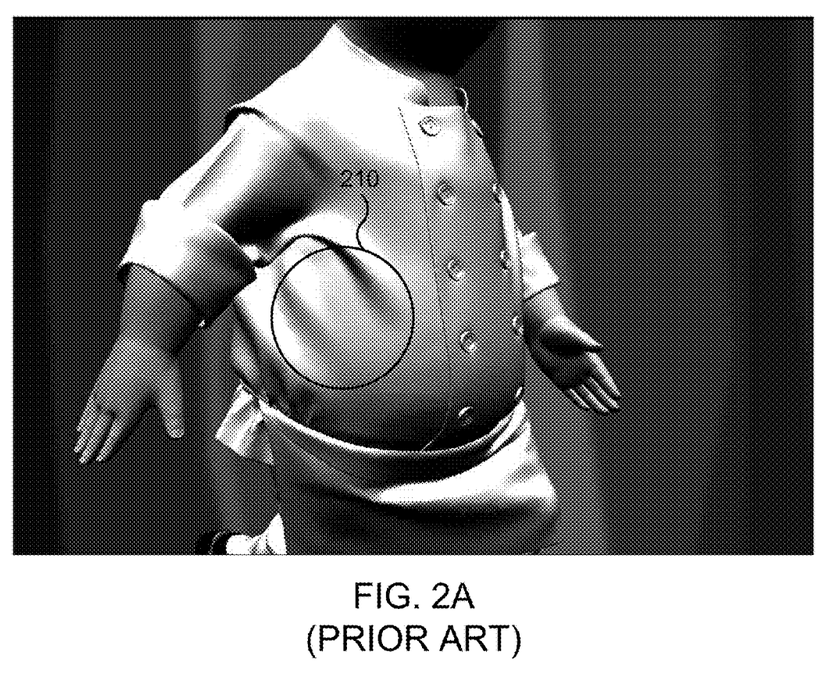
FIGS. 2A and 2B are screenshots of a human character wearing a jacket.
Figure 2B:
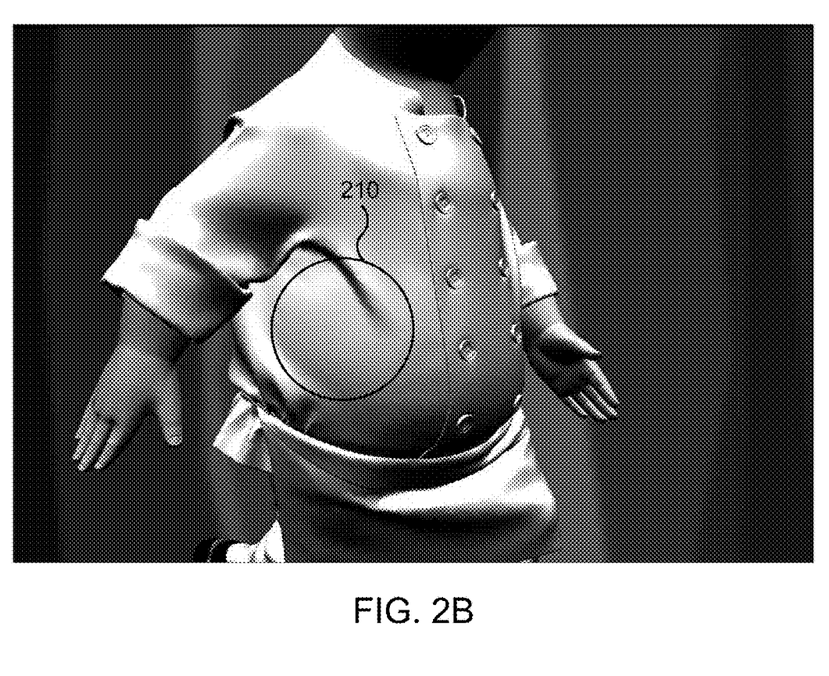

FIGS. 2A and 2B are screenshots of a human character wearing a jacket. FIG. 2A depicts a non-simulated human character who has just stopped walking. The human character is wearing a jacket that may be simulated by computer system 100 using a physically-based numerical technique. Additionally, the motions and positions of the jacket may be influenced by motions and positions of the human character as animated or posed by an animator.

In FIG. 2A, at the moment the human character ceases walking, there are folds and wrinkles in motion starting at the sleeve and down the torso of the human character in area 210. The folds and wrinkles continue moving in a creeping or oozing behavior for a small number of seconds after the human character stops walking.

FIG. 2B depicts the human character after the motion of the folds and wrinkles of the jacket stop. In this example, the crease line down the arm has changed slightly and the wrinkle across the right shoulder has shifted in area 210. Many of the folds and wrinkles along the torso have disappeared. The vertical wrinkle down the torso has smoothed out, and the cloth of the jacket appears to wear naturally on the human character.

Accordingly, in various embodiments, while the human character is walking, computer system 100 detects the motion of the jacket, and allows the folds and wrinkles in the cloth of the jacket to be simulated using physically-based numerical techniques. When the human character ceases walking, computer system 100 detects the changes in speed, direction, and the like.

Thus, computer system 100 automatically applies forces to the jacket (e.g., at or on locations, surfaces, particles, and the like that form the jacket) to maintain the shape of the jacket. Therefore, the creeping or oozing behavior of the cloth that results in the state of the jacket depicted in FIG. 2B is not reached when the human character stops walking Advantageously, computer system 100 reduces or eliminates the creeping or oozing behavior of the cloth of the jacket.

In some embodiments, computer system 100 provides techniques to allow an animator to specify how positions of particles associated with a simulated object (e.g., the jacket of FIGS. 2A and 2B) relative to a non-simulated object (as opposed to the particles themselves as discussed above) are influenced by motions of the non-simulated object (e.g., the human character of FIGS. 2A and 2B). For example, if the motions of the human character cause one or more metrics to exceed a predetermined threshold, such as when the character is moving normally, computer system 100 allows the jacket to change shape by adjusting the positions of particle of the jacket with respect to human character to allow the jacket to appear responsive to the characters motions. In other words, when the character is moving at or above a particular speed, computer system 100 allows the jacket to fold and wrinkle.

If the motions of the character do not cause one or more metrics to exceed a predetermined threshold, such as when the character is slightly moving or moving during "keep alive" motion, computer system 100 may apply one or more forces to the particles of the jacket, such as a velocity dragging force, to maintain the positions of the particles of all or part of the jacket with respect to a reference position on the human character. Therefore, when the character slows down to under a particular speed or stops, computer system 100 advantageously preserves the shape of the jacket to prevent the appearance of the creeping or oozing folds and wrinkles.

Figure 3:
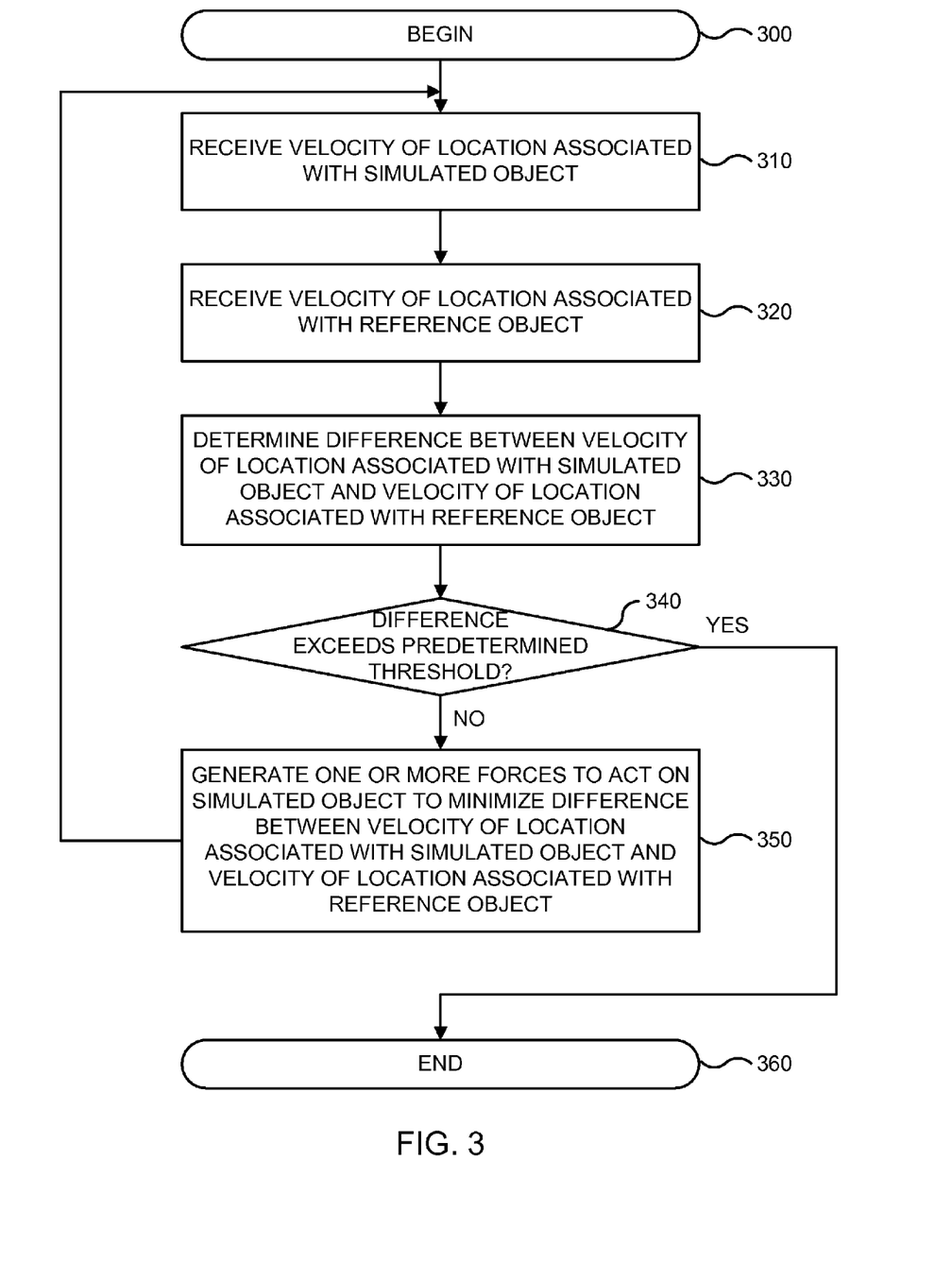
FIG. 3 is a simplified flowchart for preserving shape of a simulated object using velocity dragging in one embodiment according to the present invention.

FIG. 3 is a simplified flowchart of a method for preserving shape of a simulated object using velocity dragging in one embodiment according to the present invention. The processing depicted in FIG. 3 may be performed by software modules (e.g., instructions or code) executed by a processor of a computer system, by hardware modules of the computer system, or combinations thereof. FIG. 3 begins in step 300.

In step 310, computer system 100 receives velocity of a location associated with a simulated object. Some examples of a location associated with a simulated object are a point, a particle, a surface region, a set of particles, a set of surfaces, and the like. The location may be on, substantially on, and near the simulated object.

In step 320, computer system 100 receives velocity of a location associated with a reference object. The reference object may be a kinematic or non-simulated object, or a copy of the simulated object having a different state or at a different time.

In some embodiments, computer system 100 receives a mapping between a point associated with a simulated object and a point associated with a reference or non-simulated object. In general, a mapping is any rule, association, function, and the like, that establishes a relationship. For example, a point on a cloth garment may be mapped to the closest point on the skin of a character object at bind-time or pose-time.

In step 330, computer system 100 determines a difference between the velocity of the location associated with the simulated object in the velocity of the location associated with reference object. In step 340, if a difference does not exceeds a predetermined threshold, in step 350, computer system 100 generates one or more forces to act on the simulated object to minimize the difference between the velocity of the location associated with the simulated object in the velocity of the location associated with the reference object.

The one or more forces may be a friction force or a dragging force. The forces, for example, may slow the velocity of the location associated with the simulated object or accelerate the location associated with the simulated object such that the velocity of the location associated with the simulated object becomes substantially align or equivalent to the velocity of the location associated with the reference object.

As a result, computer system 100 reduces creeping or oozing over time to provide visually acceptable simulations. In general, velocity dragging is a technique that allows computer system 100 to prevent the oozing or creeping of a simulated object, such as clothing or hair, while leaving the clothing or hair free to respond to keep alive motion of a reference or non-simulated object. FIG. 3 ends in step 360.

Figure 4:
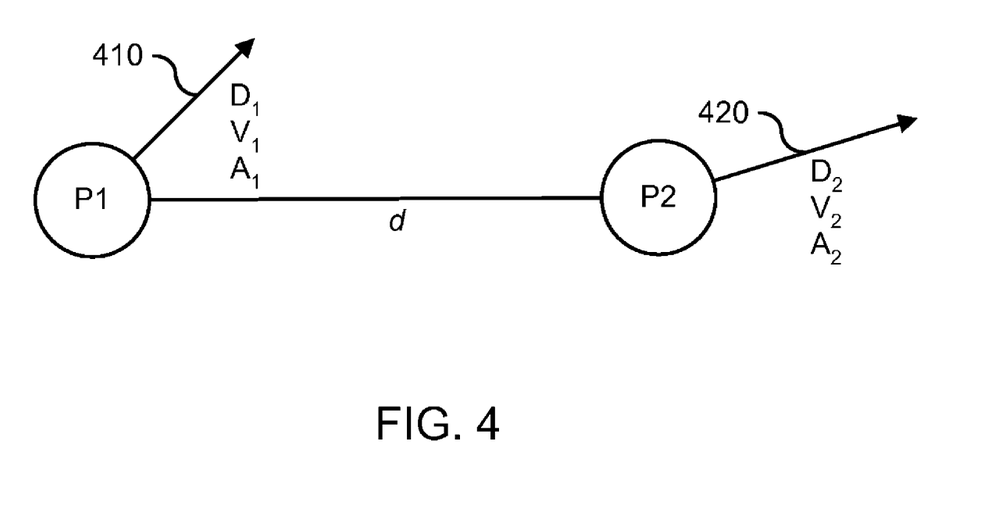
FIG. 4 is simplified block diagram of a point associated with a simulated object and a reference point associated with a reference or non-simulated object in one embodiment according to the present invention.

FIG. 4 is simplified block diagram of a point P1 and point P2 in one embodiment according to the present invention. In this example, point P1 is moving in a particular direction $D_1$, at a given velocity $V_1$, and at a given acceleration $A_1$. For example, vector 410 may indicate the direction and/or magnitude of the velocity associated with point P1. Vector 410 may also indicate the magnitude and direction of a force accelerating point P1. Point P1 may be located on, in, or near a simulated cloth garment.

Point P2 is moving in a particular direction $D_2$, at a given velocity $V_2$, and at a given acceleration $A_2$. For example, vector 420 may indicate the direction and/or magnitude of the velocity associated with point P2. Vector 420 may also indicate the magnitude and direction of a force accelerating point P2. Point P2 may be located on, in, or near a reference or non-simulated object, such as a human character.

In some embodiments, computer system 100 maps point P1 to P2 as a reference point or location. Computer system 100 may attempt to match the velocity, direction, acceleration, etc. of point P1 to the velocity, direction, acceleration, etc. of the reference point P2.

For example, let the position and velocity over time of a simulated cloth particle be defined where p(t) and v(t)=ṗ(t). Each cloth particle has a "tracking" position it monitors. Typically, the tracking position of the cloth particle is a reference point on the character's skin that it is closest to. However, other reference points or tracking points may be used.

In various embodiments, computer system 100 uses velocity dragging to encourage a cloth particle to match the velocity $v_{track}(t)$ of its reference point. Typically, computer system 100 does not penalize the cloth particle for being any different position than attract point, as the absolute this positions in space of the tracking points form a bad representation of a garment's shape. However, the velocity of the tracking point at any given moment in time provides an indicator or clue as to where the associated particles on the garment are to go. For example, if the human character is absolutely still, all of the tracking velocities $v_{track}(t)$ will be zero. However, the character has some small keep-alive motion, the tracking velocities $v_{track}(t)$ will reflect the keep alive-motion. Accordingly, computer system 100 uses velocity dragging to encourage the cloth particles to match the velocities $v_{track}(t)$ of their reference points.

In various embodiments, computer system 100 uses equation (5) to provide velocity dragging:

$$f(t)=F(v(t),v_{track}(t)) \quad (5)$$

In this example, the function F depends on the velocity of a particle associated with a simulated object and the velocity of a tracking or reference particle associated with a non-simulated object.

In some embodiments, to exert a simple linear drag force, computer system 100 may provide velocity dragging using equation (6):

$$f(t)=F(v(t),v_{track}(t))=-k(v(t)-v_{track}(t)) \quad (6)$$

which acts to make the v(t) be equal to be tracked $v_{track}(t)$, with k a user-supplied or animated coefficient. Setting k to a sufficient value overwhelms any tendency of particles to ooze, while forcing the particles to also follow the keep-alive motion.

In some embodiments, computer system 100 uses other derivatives then first derivatives, such as velocities. Other such higher order derivatives may also be used.

Figure 5A:
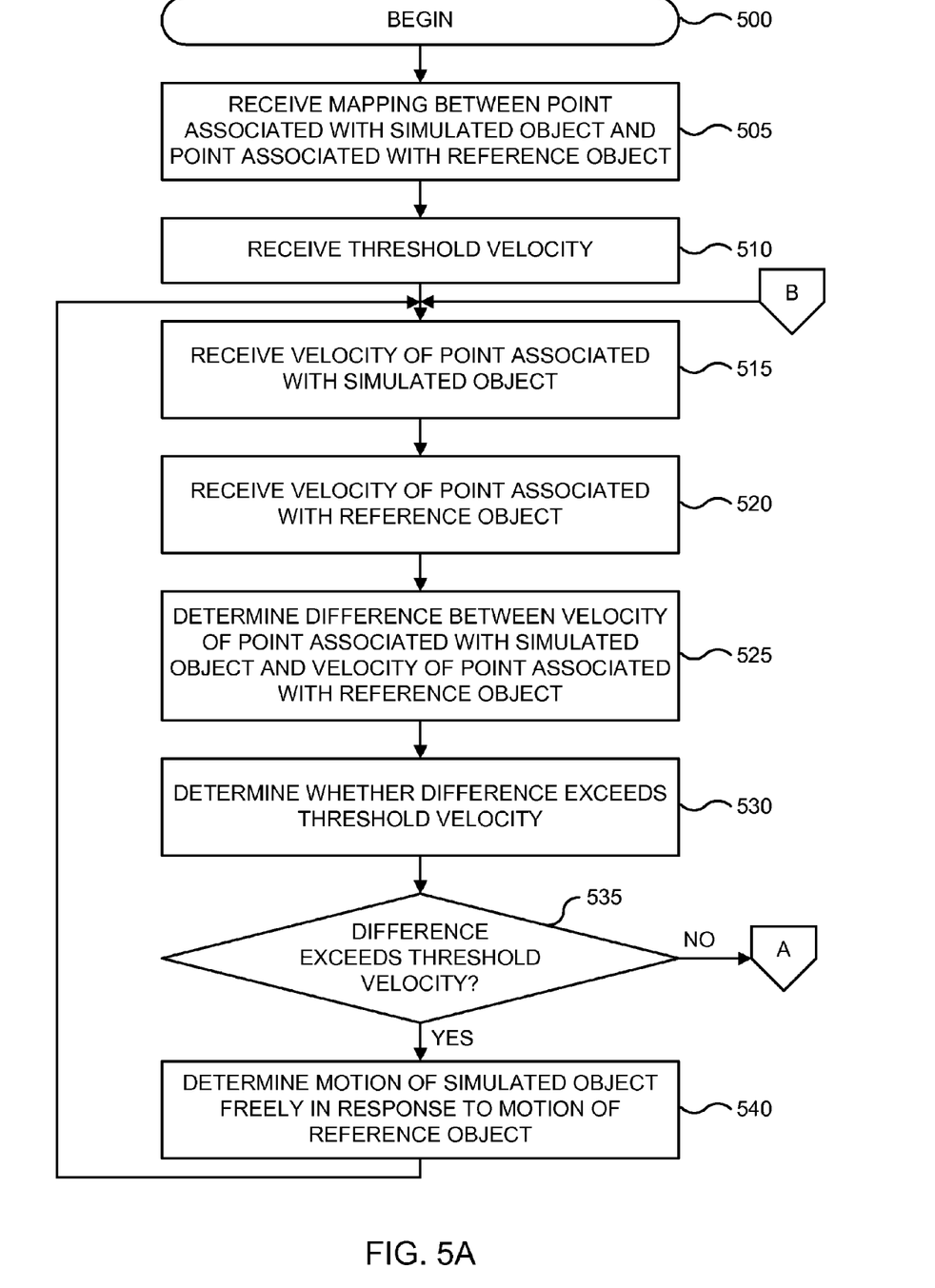
FIGS. 5A and 5B are a flowchart for preserving shape of a simulated object using velocity dragging in one embodiment according to the present invention.
Figure 5B:
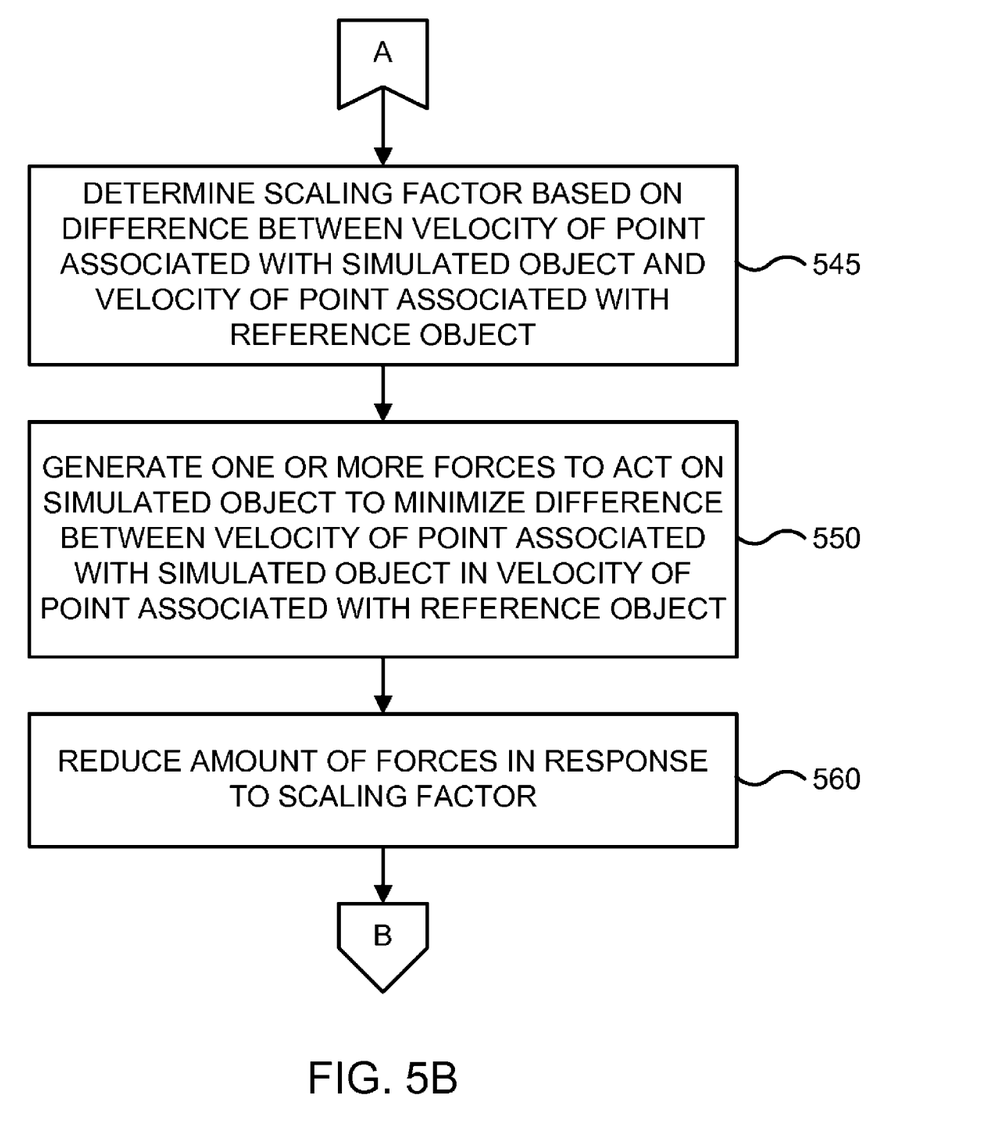

FIGS. 5A and 5B are a flowchart of a method for preserving shape of a simulated object using velocity dragging during motion in one embodiment according to the present invention. FIG. 5 begins in step 500.

In step 505, computer system 100 receives a mapping between a location associated with a simulated object (e.g., point P1 of FIG. 4) and a location associated with a reference or non-simulated object (e.g., point P2 of FIG. 4). For example, computer system 100 maps a point on the simulated object to a point on the reference object. In another example, computer system 100 maps a point or set of points on a simulated object to a surface region honor associated with reference object.

In step 510, computer system 100 receives a threshold velocity. In general, a threshold is any point, limit, or set of conditions.

In step 515, computer system 100 receives a velocity of the point associated with the simulated object. For example, computer system 100 may receive a value indicative of the velocity of the point associated with the simulated object. In step 520, computer system 100 receives a velocity of the particle associated with the non-simulated object.

In step 525, computer system 100 determines a difference between the velocity of the point associated with the simulated object and the velocity of the point associated with reference object. In step 530, computer system 100 determines whether the difference exceeds the threshold velocity.

In step 535, if the difference between the velocities exceeds the threshold velocity, in step 540, computer system 100 determines motion of the simulated object freely in response to motion of the reference object. In step 535, if the difference between the velocities does not exceed the threshold velocity, computer system 100 continues processing in FIG. 5B.

FIG. 5B begins in step 545. In step 545, computer system 100 determines a scaling factor based on the difference between the velocity of the location associated with the simulated object and the velocity of the location associated with reference object. In step 550, computer system 100 generates one or more forces to act on the simulated object to reduce or minimize the difference between the velocity of the location associated with the simulated object and the velocity of the location associated with the reference object.

As a result, in various embodiments, computer system 100 a dragging force to act on the point associated with the simulated object such that the velocity of the point approximates the velocity of the point associated with the reference or non-simulated object. Thus, computer system 100 attempts to match the velocity of the point associated with the simulated object to the velocity of the reference point. FIG. 5 and in step 560.

Accordingly, computer system 100 eliminates or reduces the creeping or oozing behavior of the simulated object by providing dragging forces, while still allowing the simulated object to move correctly with motion of an associated non-simulated object. Advantageously, computer system 100 allows the simulated object to move and/or change its shape or wrinkle pattern as little as possible, subject to being positioned correctly or in a visually pleasing manner on the character.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for preserving the shape of simulated objects, the method comprising:
   receiving, at one or more computer systems, velocity of a location associated with a simulated object; and
   while a difference between the velocity of the location associated with the simulated object and velocity of a location associated with a reference object does not exceed a predetermined threshold, generating one or more forces with one or more processors associated with the one or more computer systems to act on the simulated object to minimize the difference between the velocity of the location associated with the simulated object and the velocity of the location associated with the reference object.

2. The method of claim 1 wherein the location associated with the simulated object comprises a point substantially on a surface associated with the simulated object.

3. The method of claim 1 wherein the location associated with the reference object comprises a surface region associated with the reference object.

4. The method of claim 1 further comprising:
   receiving a mapping between the location associated with the simulated object and the location associated with reference object.

5. The method of claim 1 wherein generating the one or more forces to act on the simulated object to minimize the difference between the velocity of the location associated with the simulated object and the velocity of the location associated with the reference object comprises generating the one or more forces to act on the location associated with the simulated object to substantially align the velocity of the location associated with the simulated object with the velocity of the location associated with the reference object.

6. The method of claim 1 further comprising:
   reducing the amount of the one or more forces as the difference between the velocity of the location associated with the simulated object and the velocity of the location associated with the reference object approaches a predetermined threshold.

7. The method of claim 6 further comprising:
   determining motion of the simulated object in response to the reference object when the difference between the velocity of the location associated with the simulated object in the velocity of the location associated with the reference object exceeds the predetermined threshold.

8. The method of claim 1 wherein the reference object comprises a non-simulated character object.

9. The method of claim 1 wherein the simulated object comprises a cloth object.

10. A non-transitory computer-readable medium storing computer-executable code for preserving the shape of simulated objects, the computer-readable storage medium comprising:
   code for receiving velocity of a location associated with a simulated object;
   code for receiving velocity of a location associated with a reference object; and
   code for generating one or more forces to act on the simulated object to minimize a difference between the velocity of the location associated with the simulated object and the velocity of the location associated with the reference object while the difference does not exceed a predetermined threshold.

11. The computer-readable medium of claim 10 wherein the location associated with the simulated object comprises a point substantially on a surface associated with the simulated object.

12. The computer-readable medium of claim 10 wherein the location associated with the reference object comprises a surface region associated with the reference object.

13. The computer-readable medium of claim 10 further comprising:
   code for receiving a mapping between the location associated with the simulated object and the location associated with reference object.

14. The computer-readable medium of claim 10 wherein the code for generating the one or more forces to act on the simulated object to minimize the difference between the velocity of the location associated with the simulated object and the velocity of the location associated with the reference object comprises code for generating the one or more forces to act on the location associated with the simulated object to substantially align the velocity of the location associated with the simulated object with the velocity of the location associated with the reference object.

15. The computer-readable medium of claim 10 further comprising:
   code for reducing the amount of the one or more forces as the difference between the velocity of the location associated with the simulated object and the velocity of the location associated with the reference object approaches a predetermined threshold.

16. The computer-readable medium of claim 15 further comprising:
   code for determining motion of the simulated object in response to the reference object when the difference between the velocity of the location associated with the simulated object in the velocity of the location associated with the reference object exceeds the predetermined threshold.

17. The computer-readable medium of claim 10 wherein the reference object comprises a non-simulated character object.

18. The computer-readable medium of claim 10 wherein the simulated object comprises a cloth object.

19. A system for preserving the shape of simulated objects, the system comprising:
   a processor; and
   a memory coupled to the processor, the memory configured to store a set of instructions when executed by the processor configured the processor to:
      receive velocity of a location associated with a simulated object; and
      while a difference between the velocity of the location associated with the simulated object and velocity of a location associated with a reference object does not exceed a predetermined threshold, generate one or more forces to act on the simulated object to minimize the difference between the velocity of the location associated with the simulated object and the velocity of the location associated with the reference object.

20. The system of claim 19 wherein the location associated with the simulated object comprises a point substantially on a surface associated with the simulated object.

21. The system of claim 19 wherein the location associated with the reference object comprises a surface region associated with the reference object.

22. The system of claim 19 wherein the processor is further configured to:
   receive a mapping between the location associated with the simulated object and the location associated with reference object.

23. The system of claim 19 wherein the processor is configured to:
   generate the one or more forces to act on the location associated with the simulated object to substantially align the velocity of the location associated with the simulated object with the velocity of the location associated with the reference object.

24. The system of claim 19 wherein the processor is configured to:
   reduce the amount of the one or more forces as the difference between the velocity of the location associated with the simulated object and the velocity of the location associated with the reference object approaches a predetermined threshold.

25. The system of claim 24 wherein the processor is configured to:
   determine motion of the simulated object in response to the reference object when the difference between the velocity of the location associated with the simulated object in the velocity of the location associated with the reference object exceeds the predetermined threshold.

26. The system of claim 19 wherein the reference object comprises a non-simulated character object.

27. The system of claim 19 wherein the simulated object comprises a cloth object.

\* \* \* \* \*